United States Patent Office 3,661,840
Patented May 9, 1972

3,661,840
PEELABLE METAL PROTECTANTS
Henry M. Deutsch, Fullerton, Calif., assignor to
Organocerams, Inc., Placentia, Calif.
No Drawing. Continuation-in-part of application Ser. No.
642,198, May 29, 1967. This application Apr. 18, 1968,
Ser. No. 722,156
Int. Cl. C23b *3/04*
U.S. Cl. 260—41.5 R
10 Claims

ABSTRACT OF THE DISCLOSURE

A low solvent, high solids containing maskant or metal protectant film forming liquid composition including a low molecular weight liquid diene prepolymer having end and side chain functionality such as a 1000–2000 equivalent weight hydroxyl, thiol, epoxy, amine, carboxyl, chloro or isocyanate terminated and side chain modified diene polymer having a functionality of at least 2 and a cross-inking and curing agent such as an aliphatic, cycloaliphatic or aromatic polyisocyanate, polyamine, polyol, or polybasic acid, acid chloride or anhydride. Said composition being curable to form a peelable polymeric film having a molecular weight greater than 20,000. The maskant film may contain aluminum, magnesium or calcium carbonate, oxide or silicate fillers such that the film is translucent as applied, but becomes visible in regions that are mechanically stressed.

CROSS-REFERENCE TO RELATED APPLICATION

This application is a continuation-in-part of my copending application Ser. No. 642,198, entitled "Method and maskant Composition for Chemical Milling or Plating," filed on May 29, 1967, now U.S. Pat. 3,544,400.

BACKGROUND OF THE INVENTION (1) Field of the invention

The present invention relates to maskant forming and metal protecting liquid compositions and to methods of preparing and utilizing such compositions in chemical milling, plating and fabricating metal articles.

(2) Description of the prior art

A sophisticated art of precision, selective etching or plating of metal workpieces known as chemical milling has developed in which portions of a metal object are removed or additional metal is added to obtain an article having a desired structural or ornamental configuration. The metal pieces are coated with several layers of a liquid maskant forming material which, when cured, provides a resilient, peelable film resistant to the etchant or plating bath employed in the process. The maskant is then scribed and cut through with a sharp knife in the selected area to be etched or plated and this portion is removed from the maskant by peeling.

The currently used chemical milling maskants are prepared from relatively low solids solutions or dispersions generally containing less than about 45% of high molecular weight prepolymerized elastomeric or elastoplastic resins. In order to have workable viscosities and to reduce bubbling and cobwebbing during application, the resin forming liquid is usually further diluted to about 25 to 30% solids before application to the workpiece. In a 50% solids solution, solids only comprise 35% of the volume and therefore, the wet thicknes is about three times the dry thickness and multiple consecutive coatings, of at least three layers with inter-spaced drying are necessary to build up the appropriate film thickness without sagging, cobwebbing or bubbling.

This procedure is not only time consuming but the elimination of the solvent vapors presents toxicity and flammability hazards and uniform film thickness is difficult to attain by means of the multiple coating procedure. Furthermore, bulk volume of the product is unnecessarily high and excessive solvent losses add increased expense with no compensatory advantages.

During the handling and fabrication of articles from metal sheets such as aluminum or titanium, it is imperative that the soft clad exterior surfaces that will be displayed in the final item be protected from damage by corrosion or abrasion during handling and fabrication of the article. On final inspection of an air frame assembly, it is not unusual for the inspector or the customer to require the replacement of several skins due to corrosion or abrasion blemishes. If the blemish is a surface depth only, and can be polished, a typical skin is 20 feet long by 5 feet wide and to remove just one blemish, this requires polishing the total 100 square feet. If the blemish is too deep for polishing, it is then necessary to remove all the rivets and replace the skin.

Some temporary protection is provided by interleaving paper between each sheet. However, this is only effective during stack storage and the paper must be removed during handling and fabricating of the sheet. It would be most desirable to have a material that will protect at least one surface of the sheet during storage, mechanical fabrication and chemical operation such as etching, milling and laminating. Several resinous protectants are available, but are deficient in many respects. Most of the materials result in thin penetrable films that expose the surface to corrosion or abrasion. Other films are too hard and non-elastic and thus are easily fractured due to their brittleness and cannot withstand bending of the metal sheet. The most serious problems are encountered in the tendency of the films to stick to adjacent surfaces and to the metal piece itself requiring special precautions when stacking and handling and very severe and costly chemical cleaning to remove the films.

One of the most successful and widely used metal protectants is an acrylic based material. These acrylic compositions are again low solids in content and several passes are required just to build up just a few mils of these films. The acrylic films are laid down from a solvent dispersed system. The films are thermoplastic and fairly soft when hot and to protect the film, the sheets are interleaved with waxed paper during stacked storage. Moreover, the acrylic system is not wholly compatible with the metal sheets and is unpredictably temperamental as to its bond with the base sheet. Because of this, each sheet must be separably inspected in a number of areas with a strip of special tape which is applied to the film, and if the film is not sufficiently adherent to the sheet, the whole sheet is rejected and must go through the stripping and respraying line. Furthermore, horizontal stack bonding with the acrylic coated sheets is not practical since the soft acrylic film would flow or exude. When this is followed by mechanical shaping, the pattern would be impressed into the metal.

The acrylic is removed by liquid solvent such as a combination of trichloroethylene and toluene, methyl ethyl ketone or other solvent. However, the acrylic is extremely difficult to remove and even after prolonged treatment with solvent, the surface remains hard to paint in that the paint does not sufficiently bite into the surface or fish eyes develop in the dried paint film.

When it is desired to produce a doubler, that is two or more metal sheets bonded by adhesive, the exterior surface must be protected during solvent and chemical cleaning and etching to prepare the surface for the adhesive. Furthermore, the outer surface protectant must be able to withstand the cure cycles of the adhesive. Again, the thermoplastic acrylics are not suitable because of the heat and chemicals encountered during the cure step which could cause the material to flow and/or damage the bond of the acrylic to the metal surface.

SUMMARY OF THE INVENTION

However, according to the present invention, a resilient maskant or protectant coating having a dry thickness from 5 to about 30 mils can be applied in a single pass without bubbling or sagging and when cured, results in a continuous film that is sufficiently adhered to the metal base so that no leakage of etchant or plating solution occurs between the film and the base, yet the film is sufficiently cohesive, that is, has sufficiently high tensile strength, so as to be manually peelable after the etchant or plating step is completed. The film is chemically resistant to either acid or basic etchants or salt solutions.

The film forming compositions of the invention may be sort or long pot life materials curable at room or elevated temperature. A further desired preferred characteristic of the maskants is translucency as applied but possessing the ability to turn opaque under mechanical stress permitting the total etch pattern to be either prescribed on the substrate article or to be scribed onto the maskant before immersion into the etching bath.

DESCRIPTION OF THE PREFERRED EMBODIMENT

It has been found that maskant or protectant films of sufficient thickness and possessing very desirable properties when cured can be applied by a single pass of a curable low molecular weight liquid elastomer or elastoplastic resin forming solution or dispersion that requires little or no volatile solvent to reduce application viscosity. The high solids low solvent solutions are possible according to the invention since the film forming compositions contain as an essential component, a liquid polymer which is modified to contain reactive end and/or side groups capable of in situ cross-linking or chain extending to form high tensile strength continuous polymers.

The liquid prepolymers employed are preferably of the diene elastomer type, for example, polymers of a conjugated diene containing from 4 to 12 carbon atoms per molecule and preferably 4 to 8 carbon atoms per molecule, such as 1,3-butadiene, isoprene, 2,3-dimethyl-1,3-butadiene, 1,3-pentadiene (piperylene), 3-methyl-1,3-pentadiene, 1,3-heptadiene, 3-butyl-1,3-octadiene, phenyl-1,3-butadiene and the like. The conjugated diene may also contain halogen hydroxy, carboxyl or lower alkoxy substitutents along the chain such as chloroprene, fluoroprene, 2-methoxy-1,3-butadiene, 2-ethoxy-3-ethyl-1,3-butadiene, and 2-ethoxy-3-methyl-1,3-hexadiene.

The comonomer should not exceed 35% of the polymer in order to preserve the elastomeric properties. Suitable comonomers are vinyl compounds such as vinyl-substituted aromatic and aliphatic compounds. Examples of comonomers that can be employed in the elastomer forming liquid prepolymers of the invention include acrylonitrile, methacrylonitrile, propylene, butene, isobutylene, styrene, 1-vinylnaphthalene, 2-vinylnaphthalene, and alkyl, cycloalkyl, aryl, alkaryl, aralkyl, alkoxy, aryloxy, and dialkylamino derivatives thereof.

The equivalent weight of the liquid prepolymer is at least a thousand and not usually more than five thousand. The functionality of the prepolymer is advantageously slightly over 2, but less than 5 to form by cross-linking and chain-extending final polymers of molecular weight of at least 20,000. With the higher molecular weight prepolymers, it may be necessary to apply heat to reduce viscosity before applying the composition to the substrate. Therefore, the equivalent weight is preferably from 1000 to 3000.

Functionality is provided by reactive terminal and side groups which may be at least one of thiol, (—SH) carboxyl, (—COOH) hydroxyl (—OH), allylic chlorine, (—CH$_2$—CHCH$_2$Cl), isocyanate (—N=C=O), epoxy or amine. Upon addition of polyfunctional reactive coupling agents and suitable catalysts or accelerators, the low molecular weight liquid reacts in place on the workpiece either at ambient or elevated temperature to produce a high molecular weight fully compounded polymeric maskant. The functionality is preferably maintained within the range of 2.1 to about 2.5 in order that excessive cross-linking does not transform the product into too plastic a state and thus reduce the resilient properties desirable for proper chemical milling masking purposes.

The diene prepolymers preferably contain a minimum amount suitably below 40% of 1,2 addition units to avoid excessive decrease of elastomeric properties. A suitable prepolymer is a polymer of equivalent weight of about 1000–2000 having a functionality slightly greater than two and comprises 60% cis 1,4 units, 20% trans 1,4 and about 10% 1,2 vinyl units.

The coupling-curing systems can include various types of polyfunctional curatives reactive with the end or side chain functional groups. The thiol or hydroxyl modified diene liquid prepolymers can be coupled and cured with aliphatic, aromatic or cycloaliphatic polyfunctional compounds containing isocyanate, carboxyl anhydride, amine, acid chlorides, hydroxyl or epoxy groups.

Preferably, the polyisocyanates are those represented by the general formula $R(NCO)_m$ wherein R is a polyvalent organic radical containing from 2 to 30 carbon atoms and $m$ is 2, 3 or 4. R can be aliphatic, cycloaliphatic or aromatic. It is preferred that the organic radical be essentially hydrocarbon in character although the presence of unreactive groups containing elements other than carbon and hydrogen is permissible.

Examples of suitable compounds of this type include benzene 1,3-diisocyanate, hexane, 1,6-diisocyanate, tolylene 2,4-diisocyanate (TDI), tolylene 2,3-diisocyanate, diphenylmethane 4,4'-diisocyanate, naphthalene 1,5-diisocyanate, diphenyl 3,3'-dimethyl 4,4'-diisocyanate, diphenyl 3,3'-dimethoxy 4,4'-diisocyanate diethyl ether, 3(diethylamino) pentane 1,5-diisocyanate, butane 1,4-diisocyanate, cyclohex-4-ene, 1,2-diisocyanate, benzene 1,3,4-triisocyanate, naphthalene 1,3,5,7-tetraisocyanate, naphthalene, 1,3,7-triisocyanate, toluidine diisocyanate, isocyanate terminated prepolymers, polyaryl polyisocyanates, and the like.

A suitable commercial available polyaryl polyisocyanate is known as PAPI–1. This material has an average of 3 isocyanate groups per molecule and an average molecular weight of about 380.

Exemplary polybasic acids reactive with hydroxyl or thiol modified polymers of the invention include maleic acid, pyromellitic acid, succinic acid, phthalic acid, terephthalic acid, trimellitic acid, and the like. Acyl chlorides such as phthaloyl chloride, terephthalyl chloride and fumaryl chloride, can be utilized to couple the hydroxy groups of the prepolymer as can such compounds as dichloromethylphosphonic dichloride, and the like.

Isocyanate modified diene polymers and those containing allylic chlorine such as low molecular weight polychloroprenes are chain extended and cured with polyamines. Examples of such polyamines include tetraethylenepentamine, ethylenediamine, diethylenetriamine, triethylenetetramine, o-phenylenediamine, 1,2 - propanediamine, 1,2-butanediamine, piperazine, 1,2,3-benzenetriamine, 3,3' - biphenyl-diamine, 3,3 - dichlorobenzidine, 4,4-dichlorobenzidine, 4,4-o-dichloroaniline, 4,4-methylenebischloraniline, methylene dianiline or N,N'bis(1,4-dimethylpentyl) - paraphenylenediamine. The fatty diamines or amine terminated polyamides such as can be produced by condensation of polyamines with polybasic acids can also be used.

Urethane or ester linked polymers are formed when isocyanate or carboxylic modified diene polymers are cured with polyhydroxy compounds. These compounds can be either aliphatic or aromatic polyols or certain polyether products. Examples of such coupling-curing agents include castor oil, glycerol, propylene glycol, neopentylglycol, pentaerythritol, trimethanolethane, trimethanolpropane, butanediol or hexanetriol.

It is thus seen that an essentially diene elastomer is formed of a plurality of prepolymer elastomeric polydiene units joined by coupling reagents which condense to form linking urethane, thiourethane, ester, urea alkyl urea, thiourea, aminoalkyl units or combinations thereof.

Generally, the coupler is present in the range of 50 to 150% of stoichiometric based on the functionality of the prepolymer. Polymers can be cured at temperatures from ambient to 500° F. although preferably they are curable in the range of 50° F. to 100° F. The time of cure can be anywhere from several minutes to several days, again depending upon the polymer being cured, the coupler and the temperature of the curing reaction. Curing can be accelerated by appropriate agents.

The curing is carried out after the prepolymer has been compounded with pigments, extenders, accelerators and an optional resinous adhesive material and worked up with solvent to a smooth liquid state. For short pot life materials, the coupling agent and the accelerator are not added until substantially immediately before the liquid is applied to the metal part.

In addition to the diene liquid prepolymer and the coupling agent, the film forming compositions typically can also contain an antioxidant such as a hindered phenol, or an aromatic amine such as phenylalphanaphthylamine, a moisture scavenger such as activated alumina, silica or sodium alumina silicate, and an aromatic or polar plasticizer. Exemplary plasticizers are hydrocarbon oils such as a naphthenic oil, a chlorinated hydrocarbon oil such as an Arachlor product or a polyether or an ester such as dibutyl or dioctyl phthalate or tricresyl phosphate. A quantity of aromatic or low molecular weight solvent such as toluene or methyl ethyl ketone (MEK) may be present if required. All additives are present in amounts within ranges specified below to enhance the chemical and physical properties of the maskant.

Carbon black, titanium dioxide silica or various mineral silicate or carbonate fillers can be added to improve the tensile strength of the resultant film. However, with opaque filled maskants, it is difficult to see scribe lines, surface imperfections, abrasions or bubbles. It is therefore preferred that the final maskant be translucent as applied, but capable of being rendered visible in regions of mechanical stress. These objectives can be secured by choosing fillers whereby the difference in refractive index of the filler $n_p$ (when contacted by the matrix polymer of the maskant) and the matrix $n_r$ is less than 0.5 in accordance with the teaching of my earlier Patent No. 3,227,589. Preferred translucent pigments are calcium, magnesium, barium or aluminum silicates, although $SiO_2$ or calcium, magnesium or zinc carbonates or others may be incorporated into the film. These fillers are usually present in the range of 10 to 100 phr. and preferably 25 to 50 phr.

Adhesion of the maskant or protectant to the metal article can be modified by adding an adhesive resin to the formulation in an amount to give the desired adhesion. The amount utilized will vary with the amount of film forming diene prepolymer present and the type and condition of the surface being treated. However, excessive amounts should be avoided since that may cause improper hand-stripping properties. Use of amounts in the ranges given below results in satisfactory adhesion with good stripping qualities. The preferred adhesive resins are phenolics, epoxies or other resins of the thermosetting type, suitably an alkyl phenolaldehyde resin such as a butyl or t-butyl phenolaldehyde resin. Many commercial forms of these resins are available such as Durez 13355 (Hooker Electro Chemical) or Epon 1001 (Shell).

The pot life of the formulation, speed of curing and properties of the final polymer are also influenced by the choice of accelerator and activator. The composition may further contain small amounts of conventional diene curatives such as sulfur compounds or free radical generating agents such as a peroxide or an azo compound such as diazobicyclooctane. The accelerator may further comprise an alkyl amine such as triethylamine, heavy metal esters such as tin dibutyldilaurate or stannous octoate. A metal oxide such as zinc or magnesium oxide may be included as an activator.

The following are typical urethane or urethane-urea linked diene elastomer formulations suitable for the "in situ" single application method of this invention:

TABLE I

|  | Example (phr.) | | | |
| --- | --- | --- | --- | --- |
|  | 1 | 2 | 3 | 4 |
| Polymer |  |  |  |  |
| Liquid polybutadiene (OH) | 100 |  |  |  |
| Liquid butadiene-25 styrene (OH) |  | 100 |  |  |
| Liquid butadiene-15 acrylonitrile (OH) |  |  | 100 |  |
| Liquid polybutadiene (SH) |  |  |  | 100 |
| Filler | 10-100 | 5-100 | 5-100 | 5-100 |
| Plasticizer | 0-50 | 0-50 | 0-50 | 0-50 |
| Accelerator | 0.01-0.6 | 0.01-06 | 0.01-.06 | 0.01-0.6 |
| Metal oxide activator | 0-10 | 0-10 | 0-10 | 0-10 |
| Moisture scavenger | 0-10 | 0-10 | 0-10 | 0-10 |
| Adhesive resin | 5-25 | 5-25 | 5-25 | 5-25 |
| Antioxidant | 0-2 | 0-2 | 0-2 | 0-2 |
| Solvent | 5-50 | 5-50 | 5-50 | 5-50 |
| Coupling-curing agent (polyisocyanate) | 10-25 | 10-25 | 10-25 | 10-25 |
| Diamine (modifier) | 0-9 | 0-9 | 0-9 | 0-9 |

The above polybutadienes have an equivalent weight of from about 1000 to 2000 and a functionality of slightly over 2. When cured at 77° F. and 50% R.H., the polymers have the following properties:

TABLE II

|  | Example | | | |
| --- | --- | --- | --- | --- |
|  | 1 | 2 | 3 | 4 |
| Pot-life (min.) | 2-30 | 2-30 | 2-30 | 2-30 |
| Tack free time (min.) | 15-60 | 30-60 | 15-45 | 60-90 |
| Cure time to develop rubbery film (min.) | 60 | 90 | 60 | 120 |
| Tensile (p.s.i.) | 600-900 | 600-1,000 | 700-1,000 | 500-800 |
| Elongation (percent) | 200-300 | 200-400 | 150-200 | 200-300 |
| Chemical resistance: |  |  |  |  |
| 6 hrs. in 10% caustic at 190° F | No effect | No effect | No effect | 30% loss in tensile |
| 6 hrs. in 10% HCl at 130° F | 30% loss in tensile | 20% | 30% | 50% |
| 6 hrs. in 10% $HNO_3$ at 130° F | Surface embrittlement | 20% | 30% | Polymer disintegrated |
| 6 hrs. in boiling water | No effect | No effect | 20% loss in tensile | 30% loss in tensile |
| Peel adhesion-clad Al (lbs.) | 0.75-2 | 1-3 | 1-3 | 1-3 |

It has further been found that the addition of certain amounts of diamines to polyisocyanate coupled hydroxyl or thiol modified polymer systems results in urethane-urea or thiourea linked final polymers of improved chemical resistance. For example, if the formulation of Example 1 is modified to contain 0-9 phr. and preferably less than 5 phr. of diamine corresponding to a $NH_2$:OH ratio of less than 1 and preferably less than 0.5, the following changes of properties result, when cured with TDI at 77°

F., 50% R.H. for 24 hours with a NCO:$NH_2$+OH ratio of 1.1.

TABLE III

| | Example ("1 shot" method) | | | | | | |
|---|---|---|---|---|---|---|---|
| | 1 | 1a | 1b | 1c | 1d | 1e | 1f |
| Diamine (phr.): | | | | | | | |
| 3,3'-dichlorobenzidine | 0 | 1 | 2 | 3 | 4 | 5 | 6 |
| 4,4'-methylenebischloroaniline | 0 | 1 | 2 | 3 | 4 | 5 | 6 |
| N,N'-bis (1,4 dimethylpentyl) paraphenylenediamine | 0 | 1 | 2 | 3 | 4 | 5 | 6 |
| Methylenedianiline | 0 | 1 | 2 | 3 | 4 | 5 | 6 |
| Tensile (p.s.i.) | 600 | 600 | 650 | 750 | 900 | 1,200 | 1,100 |
| Elongation (percent) | 200 | 200 | 250 | 300 | 250 | 200 | 175 |
| 300% modulus | | | | 750 | | | |
| Percent tensile change 10% caustic at 190° F. for 6 hrs | −15 | −10 | 0 | 0 | 0 | −20 | −30 |

Certain diisocyanates are found to give better overall physical, chemical and adhesive properties in the resultant film. In a series of experiments with hydroxy modified polybutadiene having a 0.1 excess of isocyanate cured at 77° F. and 50% R.H. for 24 hours the following results were recorded:

TABLE IV

| | Example | | | | | |
|---|---|---|---|---|---|---|
| | 1 | 2 | 3 | 4 | 5 | 6 |
| Polyisocyanate: | | | | | | |
| Toluene diisocyanate (80/20 isomer) | X | | | | | |
| 4,4'-diphenylene diisocyanate | | X | | | | |
| Polymethyl polyphenylene diisocyanate | | | X | | | |
| Toluidine diisocyanate | | | | X | | |
| Isocyanate terminated prepolymer (such as CB-75 Mobay Chemical) | | | | | X | |
| Hexamethylene diisocyanate | | | | | | X |
| Properties: | | | | | | |
| Tensile, p.s.i | 600 | 700 | 950 | 850 | 600 | 550 |
| Elongation, percent | 300 | 350 | 250 | 300 | 350 | 175 |
| Percent tensile change in 10% caustic, 190° F. for 6 hrs | −20 | −15 | −20 | −10 | −20 | −25 |

It is apparent that films with polymeric polyaryl isocyanates and toluidine isocyanates form films with optimum properties. The above isocyanate compositions are room temperature curing. Heating to 250° F. results in a 50% drop in elongation, 20–50% increase in modulus, virtually no change in tensile and a considerable improvement in chemical resistance.

The pot life of these compositions can be substantially lengthened by the use of chemically blocked polyisocyanates that are activated by heat or moisture. Suitable blocked polyisocyanates are the phenol blocked isocyanate materials such as Mondur SH, (Mobay) or Hylene MP (Dupont) phenol blocked MDI or Isonate 123P (Upjohn). Another way of permitting premixing of the ingredients of the film including the curing agent is to physically block the reactive ingredients. For example, the curing agent can be enclosed in the microvoids of a molecular sieve or enclosed in the shells of a microencapsulating material. The curing agent is activated by release from its physically blocked state by means of heat or moisture.

The maskant or protectant film forming materials of the invention can be applied by spraying, forced flowing, dipping or brushing a coating of the composition onto a substrate such as an aluminum, magnesium, ferrous, beryllium or other metal alloy and the film is cured during and after application to the substrate. Suitable equipment that can be utilized is a two component dispersing type spray gun in which the compounded polybutadiene is metered at a desired ratio and the curing agent is simultaneously metered and mixed in a small chamber seconds before being sprayed. The mixed components are deposited as a smooth uniform film that cures within 1–24 hours at ambient temperature or with heat if required.

The deposition of a smooth high solids film that is cured in place may also be effected with a modified prepolymer method in which the short chain liquid prepolymer is prereacted with an excess of coupling agent to form a polymer product with 2–9% of available functional groups from the coupling agent. The prepolymer is then compounded with pigments, adhesive resin, solvent and accelerator similar to the one-step procedure. Final curing is effected by adding a further coupling agent.

For example, a hydroxyl or thiol modified polybutadiene may be reacted with an excess of toluene diisocyanate to form 2–9% of —NCO groups. The prepolymer is compounded and then cured with a diamine, a diol, a triol or even some additional hydroxyl or thiol modified polybutadiene or mixtures thereof may be utilized as chain extending and/or cross-linking agents.

Again, the properties are dependent somewhat on the choice and concentration of coupling and accelerating agents and the properties are again substantially improved with the preferred $NH_2$:OH ratio of less than 1.

A series of compositions were prepared to show that within the stated ranges, a wide variety of accelerators will provide suitable maskant or protectant films.

EXAMPLE 1

To one hundred parts of a hydroxyl modified polybutadiene having an equivalent weight of 1300 and a functionality of slightly over two, were added 22 phr. of TDI and after reaction to form a polymer product containing 6% —NCO, the composition was compounded with filler, plasticizer oil, solvent and moisture scavenger and antioxidant in amounts previously specified. The composition was then cured for 24 hours at 77° F., 50% R.H. with the following catalysts. The curing-coupling agent in each case was 1,2-butane-diol and 3% of 4,4-dichlorobenzidine.

TABLE V

| | Example | | | | | | |
|---|---|---|---|---|---|---|---|
| | 1 | 2 | 3 | 4 | 5 | 6 | 7 |
| Type and phr. catalyst: | | | | | | | |
| Dibutyl tin dilaurate | 0.01 | 0.1 | 0.2 | | | | |
| Stannous octoate | | | | 0.1 | 0.4 | | |
| Diazobicyclooctane | | | | | | 0.2 | |
| Triethylamine | | | | | | | 0.5 |
| Properties: | | | | | | | |
| Tensile, p.s.i | 650 | 780 | 1,250 | 400 | 750 | 800 | 950 |
| Elongation (percent) | 450 | 400 | 350 | 300 | 450 | 450 | 350 |
| Percent tensile change, 10% caustic, 190° F., 6 hrs | 20 | 15 | 15 | 10 | 5 | 15 | 20 |

Due to the resistance of the maskant or protectant film of the invention to both acidic and basic chemicals and further because of the adherence to the substrate to avoid leakage even after adjacent areas have been cut and peeled, the films also are very effective as maskants in processes for the selective addition of metal whether from electroless or electrolytic baths. The maskants, for example, can be utilized in the plating of nickel, copper, gold, silver, cobalt or zinc onto metal bases such as alloys of aluminum, magnesium, ferrous, beryllium or other metals.

The following procedures are illustrative of techniques to be followed in the utilization of the maskants of the invention in selective plating onto metal substrates.

EXAMPLE 2

Chromate conversion coating

An aluminum (2024–T3) panel (10 cm. x 15 cm.) was prepared by degreasing, caustic etching for 30 seconds at 70° C., rinsing, treating in 50% by volume $HNO_3$ and then rinsing again.

After the panel was dried, a 10 mil film of the hydroxy polybutadiene polyisocyanate cured maskant film of Example 3 of Table IV was applied and cured. A pattern was scribed into the film and peeled.

The panel was immersed for five minutes in the following solution of 25° C., pH 1.5 for 5 minutes:

| | G./l. |
|---|---|
| Chromic anhydride | 5 |
| Potassium ferricyanide | 1 |
| Barium nitrate | 1.9 |
| Sodium fluosilicate | 1.35 |

A chromium conversion coating was deposited on the panel in the exposed areas. The panel was removed from the plating bath, drained, rinsed and dried at ambient conditions. The remainder of the maskant film was removed from the panel by peeling and the plated pattern was clearly defined and the maskant covered areas showed no sign of plating or attack by the plating solution.

This procedure was repeated with a steel panel coated with maskant and then selectively stripped in areas before being immersed in an electrolytic chromium bath containing 250 g./l. chromic acid with a sulfuric acid concentration of 1 to 1.5% at a current density range of about 500 amp./ft.$^2$ and a temperature of 122–131° F. A bright, hard, clearly defined chromium deposit was produced on the maskant stripped areas, the remainder of the plate being free of corrosion or deposition.

The properties of the film forming composition of the invention also provide many time, material and procedure having advantages when utilized as a peelable metatl protectant. Furthermore, new fabrication procedures become possible because of its multiple properties. The single pass application and short cure time alone saves 75 to 80% compared to the acrylic coating procedures. The film of the invention contains little solvent and does not present a solvent sticking or otherwise adhesive exterior and thus may be readily handled and stacked without difficulty.

The film of the invention is not attached to the metal, but is only peelably adhered thereto and can be simply stripped by hand or can be removed in a simple automated procedure by subjecting the film coated sheet to solvent vapor and the film will fall away from the sheet. Even though the film of the invention is only peelably adhered to the substrate, all exposed surfaces of the film exhibit extreme resistance to attack by acidic or caustic chemicals. Furthermore, the metal-film bond is not disturbed by the mechanical pressure encountered in rolling, bending or shaping the sheet. Nor is the material affected by fairly high temperature treatment of the order of 200 to 400° F. whether applied by radiation or direct steam treatment. These qualities combined to make the film of the invention a totally versatile metal protectant which provides continuous and multiple types of protection during storage, handling, mechanical shaping and etching and adhesion of metaal sheets to form laminates as will be described. Furthermore, by selective removal of the film and treatment of the exposed surface, lap bonding of the material becomes possible as does chemical milling of the laminates to provide desired structural shapes or weight reduction of the composite element.

During use of the film forming composition of the invention as a metal protectant, the composition is applied to the surface preferably in a single pass and is cured thereon to form a durable, peelably adhered protectant film. The coated sheet may then be subjected to mechanical shaping and is then fastened to other sheets by riveting, welding, or by lap bonding as will be described. The film can be removed before bonding or may be maintained on the sheet until after the rivets are secured and may be simply stripped away by hand or subjected to a vapor of solvent to loosen attachment of the film to the sheet before it is stripped away.

When it is desired to form laminates, at least one sheet of a set of metal sheets is subjected to a single spray pass of the composition of the invention which is cured to form a film. The uncoated side of the sheets is then subjected to preliminary cleaning such as vapor degreasing and then to chemical cleaning and etching. The adhesive is then applied to the etched surface which may be precoated with an adhesive primer. The two sheets are assembled into a composite and the adhesive cured, typically by placing the doubler in an autoclave. The sheets may be mechanically shaped before or after bonding. The bonded laminate is then attached by secondary fastening to another sheet by suitable means as discussed above and the metal protectant film is finally removed to expose a clear, unmarked and unblemished surface.

When it is desired to prepare such sheets for lap bonding after removal of the laminated sheets from the curing oven, a portion of the protectant film is scribed with a sharp knife and stripped from the metal sheet. This procedure is followed with at least two sets of laminated sheets. The sheets are returned to the metal cleaning and etching stations and are cleaned and etched to render the surfaces receptive to the adhesive. Adhesive is applied to each etched surface and the surfaces are joined and placed in the autoclave. After removal from the autoclave, the assembled pieces can be joined to other structures by secondary bonding techniques and the film removed. An example follows:

EXAMPLE 3

An aluminum (2024–T3) panel (10 cm. x 15 cm.) was prepared by degreasing, caustic etching for 30 seconds at 70° C., rinsing, treating the panel with 50% by volume HNO$_3$ and then rinsing again.

After the panel was dried, a 10 mil film of the hydroxy polybutadiene polyisocyanate and diamine cured maskant film of Example 3 of Table IV was applied to the panel by spraying. The procedure was repeated with an identical panel.

Both panels were prepared for application of adhesive by vapor degreasing, caustic etching, rinsing and a deoxidizing bath consisting of a sulfuric acid-sodium dichromate bath and were then dried. Each panel was then coated with an epoxy adhesive primer and then with an epoxy adhesive, in this case one manufactured by the Bloomingdale Corporation. The panels were placed in a vacuum to remove bubbles from the adhesion and were then cured in a steam autoclave for one half hour at 90 p.s.i., 250° F. The laminate was removed from the autoclave and cooled to room temperature.

A line was scribed into the protectant film with a sharp knife two inches from the end of two laminates, and the film removed to expose the substrate metal. The two laminates were returned to the metal cleaning station and subjected to solvent cleaning, caustic cleaning and sulfuric acid-sodium dichromate deoxidizing treatment. The deoxidized surfaces were coated with primer and adhesive and then joined and returned to the autoclave for a curing cycle. The joined doubler composites were removed and cooled, and were found to be firmly bonded. After two cycles of metal cleaning and curing, the film of the invention was still found to be peelably and firmly adhered to the metal.

Patterns were scribed with a sharp knife in the bottom surface of the lapped composite member and the film was removed from these areas. The lap composite was then placed in an aluminum etching bath and the metal was etched from the exposed areas to the adhesive layer to lighten the member. The lap bonded member can then be assembled by riveting as part of an airplane fuselage by riveting and the film removed by peeling or before assembly, the film can be removed by a few minutes of contact with the vapors from a vapor degreaser and the film will either fall away or can be removed with a very light peeling force.

At every step of the processing, considerable economies and conveniences are realized when utilizing the film forming composition of the invention. The film of the invention is applied in a single pass of a spray gun and can be cured at moderate heat at about 50 to 200° F. in a few minutes to several hours. However, the acrylic metal protectants must be applied several times, and usually about 7, to build up a coat of equal thickness to that of the invention and curing at 150° F. to 200° F. requires very long periods. The acrylics are sticky and must be handled with care while the elastomeric or elastoplastic films of the invention are non-sticky and can take considerable rough handling without breaking, tearing or allowing the substrate surface to be marred.

Furthermore, the film of the invention is consistently and regularly applied successful to an even film thickness of constant adhesion and peelable quality. However, the acrylics are unpredictably applied in terms of adhesive power which may be more or less than that desired. The films of the invention strip easily and readily to provide a surface that accepts paints readily while with the acrylics, severe solvent removal treatment is required and even after removal, the surface still does not provide a good bite for paint. At one air frame manufacturing facility alone, the cost of maintenance of the liquid solvent tank for removal of the acrylic film is one-half of a million dollars per year.

From the foregoing, it is evident that the compositions of the invention can be modified substantially to tailor made maskants or protectants of desired ambient or high temperature curing properties and varying physical properties suitable for particular chemical milling, laminating, plating or metal protectant applications. The high solids, low solvent compositions of the invention are efficiently applied in a single step to form a uniform film of 5 to 30 mil thickness without bubbling or cobwebbing and avoiding the delays, expense and hazard of multiple application and evaporation of excessive amounts of solvent. The final films are adherent, abrasion resistant, extensible, resistant to etchant or plating bath chemicals and are cuttable and peelable to expose the surface to be etched, plated or otherwise processed. Hence, it is apparent that the invention constitutes a marked improvement over prior art compositions and techniques.

It is further to be understood that preferred embodiments have been disclosed and that the numerous modifications and alterations are possible without departing from the scope of the invention defined in the claims that follow.

What is claimed is:

1. A composition for applying in a single application to a substrate an adherent, high molecular weight, continuous, manually peelable, etchant resistant film up to 30 mils in thickness having a tensile strength of from 400 to 1000 p.s.i., an elongation of from 150 to 450% and a pull adhesion to aluminum of from 0.75 to 3 pounds, said composition containing:
    a low molecular weight, liquid diene prepolymer resin having an equivalent weight of from 1000 to 5000 and containing between 2 to 5 end and side chain functional groups on each prepolymer molecule selected from the class consisting of hydroxyl and thio modified diene homopolymers and diene copolymers;
    10-25 parts by weight per one hundred parts of said resin of a coupling-curing agent condensible with the functional groups on said polymer and being at least one member selected from the group consisting of a polyisocyanate, and a polyamine to form a film having said properties;
    10-100 parts by weight per one hundred parts of said resin of a filler having a refractive index differing by less than 0.5 from the refractive index of said film and being selected from the group consisting of a magnesium, calcium or aluminum silicate, carbonate or oxide;
    5-80 parts by weight per one hundred parts of said resin of volatile solvent; and
    5-25 parts by weight per one hundred parts of said resin of a thermosetting adhesive resin selected from the group consisting of phenolic and epoxy thermosetting adhesive resins.

2. A composition according to claim 1 in which the functionality of the propolymers is from about 2 to 3.

3. A composition according to claim 1 containing hydroxyl or thiol modified diene liquid prepolymers of equivalent weight of from about 1000 to 2000 and a functionality of greater than 2 and less than 3 and the coupling agent is a combination of a polyisocyanate and a polyamine such that the ratio of $NH_2$:OH or SH is less than 1 and the $NCO:NH_2+OH$ or SH ratio is from 0.8 to 1.2.

4. A composition according to claim 3 in which the $NH_2$:OH ratio is less than 0.5.

5. A composition according to claim 3 in which said polyamine is a diamine selected from the group consisting of 3,3'-dichlorobenzidine, 4,4'-methylenebischloroaniline, N,N'-bis(1,4 - dimethylpentyl)paraphenylenediamine and methylene dianiline.

6. A composition according to claim 1 in which the diene copolymers contain not more than 35% of a vinyl co-monomer.

7. An article to be chemically milled or plated comprising:
    a base metallic article; and
    a chemical milling maskant peelably adhered thereto, said maskant being the cured reaction product of a liquid diene prepolymer and a polyfunctional coupling curing agent as defined in claim 1.

8. An article of manufacture comprising:
    a metal object having at least one exterior finish surface; and
    an elastomeric resinous film of from 5 to 30 mil thickness peelably adhered to said surface, said resin being the reaction product of a polyfunctional liquid diene prepolymer having a functionality from 2–5 and a polyfunctional coupling-curing agent condensible therewith as defined in claim 1.

9. A composition according to claim 1 in which the polyisocyanate coupling-curing agent is selected from polymeric polyaryl isocyanates and toluidine isocyanates.

10. A composition according to claim 1 in which the polyisocyanate coupling-curing agent is a phenol blocked isocyanate.

References Cited
UNITED STATES PATENTS

| | | | |
|---|---|---|---|
| 3,084,141 | 4/1963 | Kraus et al. | 260—94.7 N |
| 3,227,589 | 1/1966 | Deutsch | 117—6 |
| 3,317,479 | 5/1967 | Noshay et al. | 260—94.7 OX |
| 3,337,489 | 8/1967 | Cull et al. | 260—94.7 OX |

OTHER REFERENCES

Poswick et al.—Official Digest, pp. 1431–1449 (December 1958) (TP 934 F29).

Koenecke et al.—Official Digest, pp. 832–855 (June 1960) (TP 934 F29).

MORRIS LIEBMAN, Primary Examiner

H. H. FLETCHER, Assistant Examiner

U.S. Cl. X.R.

117—132 CB; 156—13; 260—77.5 AP, 78 CA, 94.7 R, 94.7 A, 94.7 N